E. P. CROCKER & A. B. PAYNE.
PANORAMIC STEREOSCOPE AND STEREOGRAPH.
APPLICATION FILED JAN. 21, 1907.
946,339.
Patented Jan. 11, 1910.
2 SHEETS—SHEET 2.
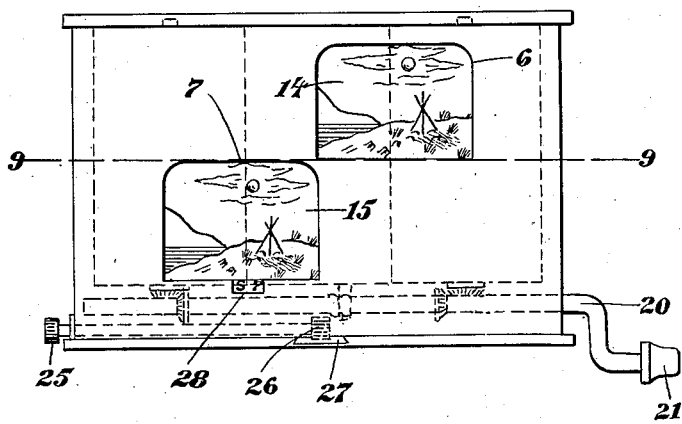
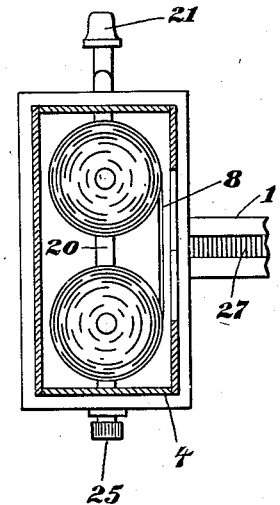
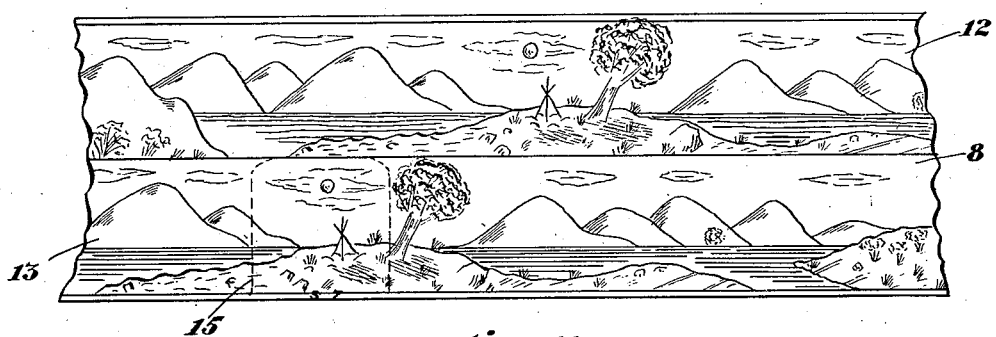
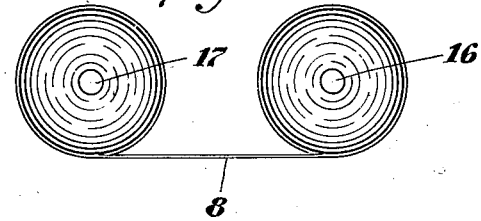
Witnesses:
Chas. A. Beckert.
Elliott R. Goldsmith.
Inventors:
Edwin P. Crocker &
A. B. Payne,
By Hugh K. Wagner,
Their Attorney.

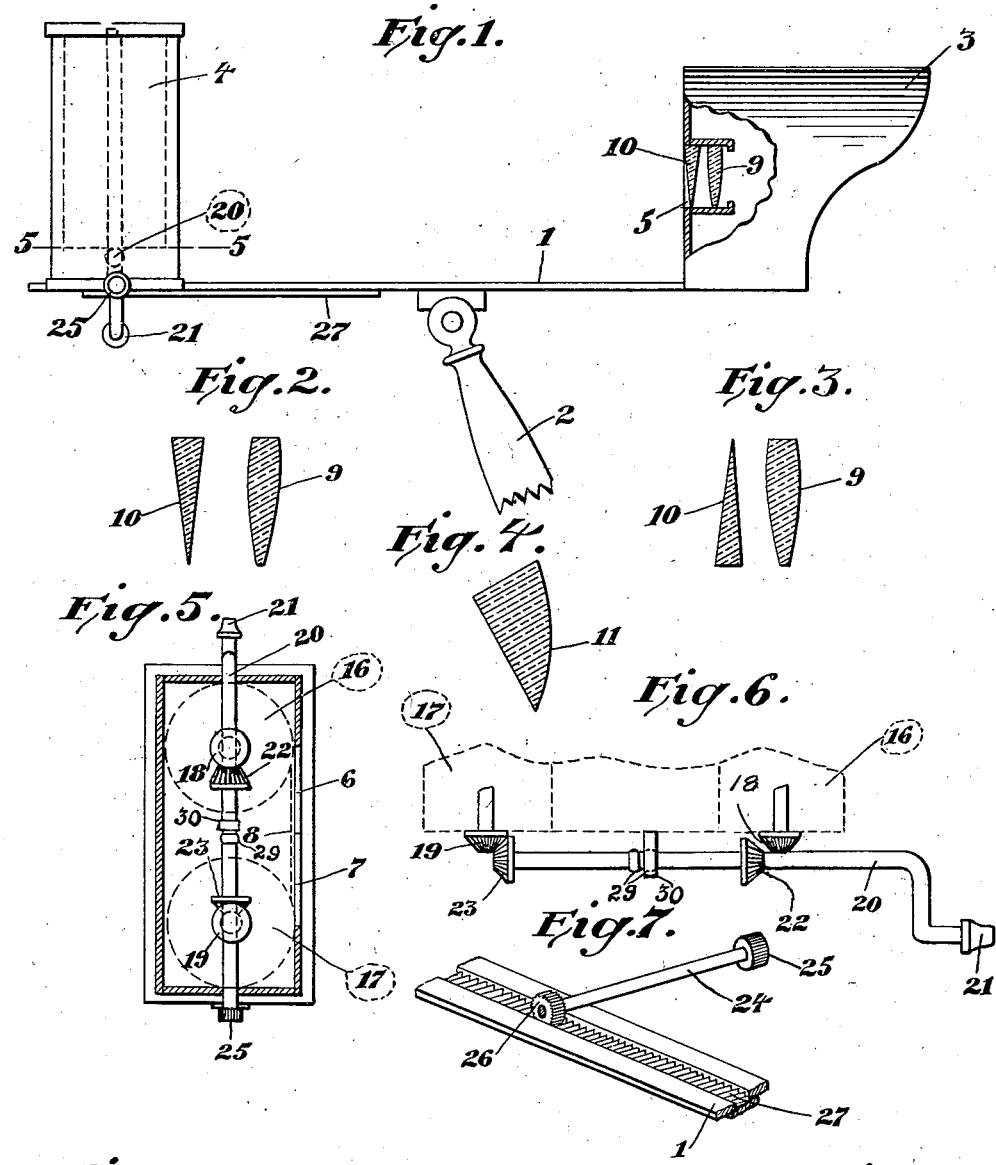

UNITED STATES PATENT OFFICE.

EDWIN P. CROCKER AND A B PAYNE, OF ST. LOUIS, MISSOURI; SAID CROCKER ASSIGNOR TO SAID PAYNE.

PANORAMIC STEREOSCOPE AND STEREOGRAPH.

946,339.             Specification of Letters Patent.     Patented Jan. 11, 1910.

Application filed January 21, 1907. Serial No. 353,266.

*To all whom it may concern:*

Be it known that we, EDWIN P. CROCKER and A B PAYNE, citizens of the United States, residing in the city of St. Louis, and State of Missouri, have invented certain new and useful Panoramic Stereoscopes and Stereographs, of which the following is a specification, reference being had therein to the accompanying drawings.

This invention relates to optical instruments, and has for its object to provide means for exhibiting panoramas, moving pictures, or the like, in a stereoscope.

In the drawings forming part of this specification, in which like numbers of reference denote like parts wherever they occur, Figure 1 is a side elevation of the herein-described invention, the lens-holder or hood being broken away to show the lenses for the right eye in section; Figs. 2 and 3 are sectional views of the lenses for the right and left eyes, respectively; Fig. 4 is a modified form of lens, shown in section; Fig. 5 is a sectional view on the line 5—5, Fig. 1; Fig. 6 is a detail view showing the mechanism for moving the films; Fig. 7 is a detail view showing the mechanism for moving the film-holder into proper focus; Fig. 8 is a front elevation of the film-holder; Fig. 9 is a sectional view on the line 9—9, Fig. 8; Fig. 10 is a front elevation of one of the films; and Fig. 11 is a top plan view of the same.

It has, heretofore, been customary to make stereoscopes with two lenses, by the refraction of which two pictures are, to the observer, made to appear as one, the two pictures, which are substantially identical, being mounted side by side on the same card. These cards are inserted in a frame held at a suitable distance from the lenses, and, when the person using the same has viewed the pictures long enough, the card is manually removed and replaced by another. By the use of such an instrument, it is, obviously, impossible to secure an uninterrupted succession of views or to display views with sufficient rapidity to form an unbroken, consecutive, and continuous series, but, on the contrary, each view is completely independent of those either preceding or succeeding it. The present invention, however, makes it possible to cause views to be exhibited in continuous succession, each view immediately succeeding or being merged with its predecessor, so that the observer can see, in rapid succession, all the views carried on a long film or strip.

In the drawings, the film picture-exhibitor which is shown as part of one example of those which are used represents a landscape panorama, but the film may, also, represent persons or objects in motion—so-called "moving pictures"—and, as in any instance, the films are moved transversely in front of the lenses, the observer sees all the objects depicted on the films in the order in which they appear thereupon. If a film like that illustrated is used, the observer will see a gradually-changing panorama just as would appear from a moving car-window, and, of course, the effect produced will vary according to the nature of the pictures shown upon the films.

To the base 1, which is supported by the handle 2, are secured at one end the lens-holder 3, and, at the opposite end, the film-holder 4. The lens-holder comprises the usual hood, curved properly to fit the head of the observer, and is provided with apertures 5 in which the lenses are placed, there being, of course, a separate lens aperture for each eye. In the front of the film-holder 4 are apertures 6 and 7, through which can be seen the movable film 8 on which the pictures are exhibited. Aperture 6 is in front of the right eye and aperture 7 in front of the left eye, the right hand aperture 6 being, also, on a higher lever than the left hand aperture 7.

The lenses 9 are ordinary stereoscopic lenses, being, preferably, cut from the same double-convex lens, and are set with their thin edges toward each other, so that they refract the rays coming from the pictures exhibited through apertures 6 and 7, so as to communicate to the eyes the impression of a single picture in an intermediate position. In front of each convex lens 9 is a prism 10, one of said prisms being set with the base up and apex down and the other with the base down and apex up, said prisms serving to refract the rays so that the views upon the film 8, which views are, as stated above, on different levels, appear to be on the same level. In the drawings, the view in front of the right eye is represented as being higher than the one in front of the left eye, and, accordingly, the right-eye prism is shown as having its base up, so that said prism will refract the rays coming from the right-hand picture so that said picture will appear to be on a lower level than it really is. The left-eye prism, being set with its base down, will refract the rays from the left-hand picture so that said picture will appear to be on a higher level than it really is. It should be understood, however, that this arrangement of views and prisms is merely arbitrary, and, if desired, the left-hand aperture may be the one at the higher level, the prisms 10 being, of course, reversed if the relative position of apertures 6 and 7 is altered. In lieu of having a convex lens and a prism in front of each eye, a single compound lens 11 may be substituted therefor, said compound lens combining the functions of both the prism and the convex lens.

The upper and lower halves of the film 8 exhibit substantially identical panoramic or other views, but, inasmuch as the upper half 12 is intended to be seen through aperture 6, simultaneously as the lower half 13 appears through aperture 7, which apertures, as hereinabove set forth, are in different vertical, as well as in different horizontal, planes, and, since it is desirable that the respective portions of the two panoramas which appear through the two apertures at any one time should be identical, the upper half 12 is, therefore, arranged so that any given view thereon is toward the right of the same view on the lower half 13. Thus, if the upper panorama 12 be so positioned that the particular part thereof designated 14 be exposed through aperture 6, section 15 of panorama 13 will appear through aperture 7, it being understood that sections 14 and 15 exhibit substantially identical views.

The film 8 is wound upon spools or reels 16 and 17, at the respective bases of which are secured beveled gears 18 and 19. Upon a shaft 20, which is journaled in the film case 4, a crank 21 being provided to turn said shaft, are secured gears 22 and 23 which are adapted to mesh in turn with and drive gears 18 and 19, so that film 8 is wound upon spool 16 and unwound from spool 17, and vice versa, according to the direction of rotation of shaft 20, the film 8 being thus caused to travel in front of the apertures 6 and 7. As the crank 21 is turned, and the film 8 thus caused to travel across the apertures, the operator sees the entire panorama pass before him. In order to permit each spool in turn to act as a receiving spool, the shaft 20 is permitted a limited longitudinal movement in its journals, and gears 22 and 23 are so spaced on said shaft, that when gear 22 is in mesh with gear 18, gear 23 is out of contact with gear 19, and vice versa. Said shaft 20 is provided centrally with enlargements 29 which are adapted to be snapped into or out of a pair of leaf springs 30 which are conformed to said enlargements, and serve to maintain said shaft 20 in either of its positions, when one or the other of gears 22 and 23 are thrown into operation.

In film-case 4 is journaled a small shaft 24, which can be turned by the knurled knob 25. To this shaft is fixed the gear 26, said gear meshing with the rack-bar 27 which is fixed upon base 1. As the shaft 24 is rotated, film-case 4 is carried toward or away from the lenses, thus to bring the film 8 to the proper focal point.

While it might be possible to have the different views on the same level (as, for example, providing two films 8, sets of reels for each, and means for causing the films to pass across their respective apertures in unison), the preferred form is as above described, with the two views both upon the same film. Such construction is not only simpler, less expensive, and more easily operated, but, in addition, the effect obtained by having the two views on different levels, but made to appear on the same level by the use of the prisms, is that pictures can thus be made to travel together without the possibility of divergence in time.

Opening out of one of the apertures 6 and 7 are the bays or cut-outs 28, through which will show any printed matter appearing on the traveling film located below the edge of said apertures. This is designed for the purpose of exhibiting a letter or other mark indicating the direction in which the observer is supposed to be looking, as, for instance, "S" for south. Besides this, each particular view on the panoramic film is supposed to be numbered, as, for instance, the one shown in Fig. 8 is numbered 7. These numbers are provided for convenience of reference to a guide book accompanying the film in which the name or character of each particular view will be stated opposite its respective number.

This invention is useful not only for purposes of entertainment, such as exhibiting landscape panoramas, moving-pictures, and the like, but is well adapted, also, to scientific studies, in which successive views of a specimen or object exhibit same from all aspects.

Where the expression "substantially identical" has been hereinabove used to describe the character of the duplicate views used in stereoscopes and in the panoramic stereoscope, the meaning is one which will be readily apprehended by persons conversant with the stereoscopic art, and reference to the fact that the photographs from which the two views are produced are taken at slightly different points to allow for the difference in position of the two eyes of the observer and even somewhat to exaggerate said allowance.

Having thus described our said invention, what we claim and desire to secure by Letters-Patent is:

1. A stereoscopic-picture-holder, said holder having two apertures, said apertures being in different horizontal and different vertical planes.

2. A stereoscope having a film-holder with two apertures, said apertures being in different horizontal and different vertical planes, and optical means which apparently center such apertures in a common plane.

3. In a stereoscope, the combination of a picture exhibitor showing pictures in pairs, a holder for said exhibitor, said holder being provided with apertures, said apertures being in different vertical and different horizontal planes.

4. In a stereoscope, the combination of a picture exhibitor showing pictures in pairs, a holder for said exhibitor, said holder being provided with apertures through which said pairs of pictures are exposed, said apertures being in different vertical and different horizontal planes, and optical means apparently centering said pictures in a common plane.

5. In a stereoscope, the combination of a picture exhibitor showing pictures in pairs, a holder for said exhibitor, said holder being provided with apertures through which said pairs of pictures are exposed, said apertures being in different vertical and different horizontal planes, and optical means apparently centering said pictures in a common plane, each of said optical means being in the same vertical plane as its respective aperture but in a different horizontal plane therefrom.

6. A stereoscopic picture-holder, said holder having two apertures in different vertical and different horizontal planes, and a traveling picture-exhibitor showing a pair of pictures simultaneously through said apertures.

7. A stereoscope having pictures exhibited in different vertical and different horizontal planes and refracting means which cause said pictures to appear as one.

8. A stereoscope having pictures exhibited in different vertical and different horizontal planes and prismatic and convex refracting means which cause said pictures to appear as one.

9. A stereoscope having pictures exhibited in different vertical and different horizontal planes and refracting means in front of each eye, said refracting means causing said pictures to appear as one.

10. A stereoscope having a film-holder with two apertures, said apertures being in different horizontal and different vertical planes, and refracting means which cause said apertures to appear as one.

11. A stereoscope having an exhibitor showing pictures in pairs, a holder for said exhibitor, said holder being provided with apertures through which said pairs of pictures are exposed, said apertures being in different vertical and different horizontal planes, and refracting means which cause said pictures to appear as one, each of said refractors being in the same vertical plane as its respective aperture but in a different horizontal plane therefrom.

12. A traveling picture-exhibitor which carries stereoscopically-paired pictures in different vertical and different horizontal planes, and refracting means opposite each picture, each refracting means comprising a stereoscopic lens and a prism.

13. A traveling picture-exhibitor which carries stereoscopically-paired pictures in different vertical and different horizontal planes and refracting means opposite each picture, each refracting means comprising a stereoscopic lens and a prism, the prisms being set one with its base up, the other base down.

14. A traveling picture exhibitor which carries stereoscopically-paired pictures, refracting means, each refracting means comprising a stereoscopic lens and a prism, and means for causing said pictures to pass in front of said refracting means.

15. A traveling film having two substantially identical pictures, like parts of said pictures being in different horizontal planes, and means in connection with said film for simultaneously exhibiting the pictures of both planes.

16. A traveling ribbon-like stereoscopic picture-exhibitor having two substantially identical panoramas thereupon, like parts of said panoramas being in different planes, and means in connection with said exhibitor for simultaneously exhibiting said like parts of the different panoramas.

17. A traveling stereoscopic picture-exhibitor bearing both of a pair of pictures, said pictures being in different vertical and different horizontal planes, combined with a member having a pair of apertures, and means for causing each of said pictures to travel across one of said apertures, and the other of said pictures to travel across the other of said apertures.

18. A stereoscope embodying a ribbon-like picture-holder, reels on which same is wound, said reels having parallel shafts, and means for simultaneously rotating said shafts, thereby to expose the picture.

In testimony whereof we have affixed our signatures in presence of two witnesses.

EDWIN P. CROCKER.
A B PAYNE.

Witnesses:
ELLIOTT R. GOLDSMITH,
CHAS. A. BECKER.